(12) United States Patent
Klaehn et al.

(10) Patent No.: US 10,954,585 B2
(45) Date of Patent: Mar. 23, 2021

(54) METHODS OF RECOVERING RARE EARTH ELEMENTS

(71) Applicant: Battelle Energy Alliance, LLC, Idaho Falls, ID (US)

(72) Inventors: John Klaehn, Idaho Falls, ID (US); Harry W. Rollins, Idaho Falls, ID (US); Joshua S. McNally, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 151 days.

(21) Appl. No.: 16/254,401

(22) Filed: Jan. 22, 2019

(65) Prior Publication Data
US 2019/0226054 A1  Jul. 25, 2019

Related U.S. Application Data (60) Provisional application No. 62/620,857, filed on Jan. 23, 2018.

(51) Int. Cl.
| | | |
|---|---|---|
| *C22B 59/00* | (2006.01) | |
| *C22B 3/22* | (2006.01) | |
| *C22B 3/16* | (2006.01) | |

(52) U.S. Cl.
CPC ............ *C22B 59/00* (2013.01); *C22B 3/1641* (2013.01); *C22B 3/22* (2013.01)

(58) Field of Classification Search
CPC ..................................................... C22B 59/00
See application file for complete search history.

(56) References Cited

U.S. PATENT DOCUMENTS

| | | | |
|---|---|---|---|
| 4,145,301 A | 3/1979 | Bruylants et al. | |
| 9,394,586 B2 | 7/2016 | Joshi et al. | |
| 2009/0011284 A1 | 1/2009 | Wang et al. | |
| 2016/0024617 A1* | 1/2016 | Auxier, II | ............... C22B 59/00 |
| | | | 534/15 |

FOREIGN PATENT DOCUMENTS

| | | |
|---|---|---|
| JP | 01-087514 A | 3/1989 |
| JP | 01-297808 A | 11/1989 |
| JP | 03-259915 A | 11/1991 |

OTHER PUBLICATIONS

Berg et al., "Paper Chromatographic Separation of Metal 2-Thenoyltrifluoroacetone Chelates", Analytical Chemistry vol. 27, No. 2 (Feb. 1955) pp. 195-198.

\* cited by examiner

*Primary Examiner* — Melissa S Swain
(74) *Attorney, Agent, or Firm* — TraskBritt (57) ABSTRACT

A method of recovering a rare earth element. The method comprises dissolving a rare earth element magnetic material in a dissolution organic solvent and a β-diketone compound to form a dissolved rare earth element mixture. A rare earth element of the rare earth element magnetic material and the β-diketone compound are reacted to form a β-diketonate chelate complex and the dissolution organic solvent is removed. The β-diketonate chelate complex is removed using a separation organic solvent, and the β-diketonate chelate complex is recovered. Additional methods are also disclosed.

21 Claims, 5 Drawing Sheets
(5 of 5 Drawing Sheet(s) Filed in Color)

METHODS OF RECOVERING RARE EARTH ELEMENTS

CROSS-REFERENCE TO RELATED APPLICATION

This application claims the benefit under 35 U.S.C. § 119(e) of U.S. Provisional Patent Application Ser. No. 62/620,857, filed Jan. 23, 2018, the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

Embodiments of the disclosure relate to methods of recovering rare earth elements. More specifically, embodiments of the disclosure relate to methods of recovering rare earth elements, such as neodymium, from a magnetic material.

BACKGROUND

Rare earth elements (REEs) are used in consumer and commercial products, such as in rare earth magnets. The rare earth magnets may include neodymium, such as an alloy of neodymium-iron-boride (Nd—Fe—B), or samarium, such as is found in samarium cobalt magnets. Neodymium magnets are permanent magnets having many applications, such as in electric motors for cordless power tools, computer hard disk drives, magnetic resonance imaging devices, wind turbine generators, speakers, headphones, electric vehicle magnets, etc. Methods to manufacture rare earth magnets include compression of the magnetic materials into blocks or sheets, which are cut to shape and then thermally processed. The scrap material and metal shavings, e.g., swarf, are produced during the manufacturing process, and include the REE alloys. With few domestic deposits of REEs, recovering the REEs from magnetic products, swarf, and scrap is of increasing importance. Aqueous-based processes, such as aqueous precipitation or aqueous/organic phase separations, are used to recover the REEs. These processes require a number of process acts to produce REEs of the desired purity, and generate large amounts of aqueous and organic waste.

SUMMARY

In some embodiments, a method of recovering a rare earth element is disclosed. The method comprises dissolving a rare earth element magnetic material in a dissolution organic solvent and a β-diketone compound to form a dissolved rare earth element mixture. A rare earth element of the rare earth element magnetic material is reacted with the β-diketone compound to form a β-diketonate chelate complex. The dissolution organic solvent is removed from the dissolved rare earth element mixture. The β-diketonate chelate complex is removed from the dissolved rare earth element mixture using a separation organic solvent and the β-diketonate chelate complex is recovered.

In other embodiments, a method of recovering a rare earth element is disclosed and comprises combining a rare earth element material with a dissolution organic solvent and a β-diketone compound to form a rare earth element mixture. A rare earth element of the rare earth element material is reacted with the β-diketone compound to form a rare earth element β-diketonate chelate complex. The dissolution organic solvent is removed from the rare earth element mixture and the rare earth element β-diketonate chelate complex is separated from the rare earth element mixture using a separation organic solvent. The rare earth element is recovered from the rare earth element β-diketonate chelate complex.

In yet other embodiments, a method of recovering a rare earth element is disclosed and comprises dissolving a material comprising neodymium in a dissolution organic solvent and a β-diketone compound to form a rare earth element mixture. The neodymium is reacted with the β-diketone compound to form a neodymium β-diketonate chelate complex. The dissolution organic solvent is removed from the rare earth element mixture and the neodymium β-diketonate chelate complex is separated from the rare earth element mixture using a separation organic solvent. The neodymium β-diketonate chelate complex is recovered.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Methods of recovering a REE from a magnetic material containing the REE are disclosed. The REE magnetic material is dissolved in solution including a β-diketone compound and a dissolution organic solvent to form a dissolved REE mixture. A β-diketonate chelate complex of the REE is separated by solvent removal and the β-diketonate chelate complex is recovered from the dissolved REE mixture. The β-diketonate chelate complex of the REE and the β-diketone compound are separated and recovered from the dissolved REE mixture using a separation organic solvent. The separation organic solvent is used, e.g., to recover the β-diketonate chelate complex by Soxhlet extraction. The separation organic solvent is a different solvent than the dissolution organic solvent. The β-diketonate chelate complex is insoluble in the separation organic solvent while other reaction products in the dissolved REE mixture are soluble in the separation organic solvent. The REE may subsequently be recovered from the β-diketonate chelate complex, providing enriched REE compared to an initial amount of the REE in the REE magnetic material. In some embodiments, the REE to be recovered is neodymium.

By utilizing organic phases (the dissolution and separation organic solvents), the methods of the disclosure enable a high recovery of the REE from the REE magnetic material while reducing the number of process acts, reducing energy requirements, and eliminating handling of an aqueous phase. In addition, waste, such as organic solvent waste, generated by the methods of the disclosure is substantially reduced or eliminated compared to the waste generated by conventional aqueous-based processes. The β-diketone from the metal chelates and solvent mixture may be recovered by acidification. Thus, the methods of the disclosure may be used to efficiently recover industrial scale amounts of the REE. By way of example only, gram quantities or greater of the REE may be recovered. The methods of the disclosure may also be used by the mining industry to recover the REE from REE oxides.

The REE magnetic material may include one or more REE, another metal, such as one or more transition metal, and an additional element, such as boron. The REE may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), yttrium (Y), or combinations thereof. By way of example only, the REE magnetic material may be a neodymium-iron-boride (Nd—Fe—B) magnetic material. The Nd—Fe—B magnetic material may include from about 20% by weight (wt %) to about 30 wt % Nd, and a 1:4 ratio of neodymium:iron. The boron may be present in small amounts, such as between 1 wt % and 3 wt %. The REE magnetic material may be a used product (a post-consumer REE magnetic material source) containing the REE magnetic material, scrap REE magnetic material, or swarf REE magnetic material, such as a bonded magnet or sintered magnet. The REE magnetic material may be in powder form, lump form, chunk form, or combinations thereof. The particle size of the REE magnetic material may affect the reactivity of the REE magnetic material in the dissolution organic solvent and the β-diketone compound, with larger particle size REE magnetic material reacting quicker than smaller particle size REE magnetic material. Without being bound by any theory, it is believed that an oxide of the REE forms on the REE magnetic material and the greater exposed surface area of the smaller particle size REE magnetic material with the oxide reduces the reaction rate of the β-diketonate to the REE magnetic material in the dissolution organic solvent. However, the reaction with the β-diketonate will progress with REE oxides. The REE magnetic material may also include other components, such as binders or coatings.

The β-diketone compound has the chemical structure of where each of X and Y is independently an alkyl group or a fluorine-substituted alkyl group. The alkyl group may include from one carbon atom to ten carbon atoms, and may be a saturated straight chain (i.e., unbranched), branched, or cyclic alkyl group. The X and Y groups may be the same or different. The carbon atom between the two ketone groups may also be substituted with an alkyl group or a fluorine-substituted alkyl group. Additional substituents may be present on the β-diketone compound to lower the boiling point of the β-diketone compound. The β-diketone compound may be symmetric or asymmetric. The β-diketone compound includes an acidic proton that reacts with a reduced metal (e.g., a reduced REE) of the REE magnetic material to form a deprotonated β-diketone compound, which chelates at least one of the REE or transition metal of the REE magnetic material. The β-diketone compound may have a boiling point that is lower than a decomposition temperature of the β-diketonate chelate complex, enabling the β-diketonate chelate complex to be removed and recovered. The β-diketone compound may include, but is not limited to, 2,4-pentadione or acetylacetone (AcAc), 1,1,1-trifluoro-2,4-pentadione (TFA), 1,1,1,5,5,5-hexafluoro-2,4-pentadione (HFA), 1,1,1-trifluoro-5,5-dimethyl-2,4-hexanedione (TFBA), 1,1,1, 2,2,3,3-heptafluoro-7,7-dimethyl-4,6-octanedione (FOD), 3-methyl-2,4-pentadione, or combinations thereof. Specific chemical structures of β-diketone compounds are shown below and boiling points of the β-diketone compounds are shown in Table 1.

TABLE 1

Boiling Points of the β-Diketone Compounds.

| Functional Group (see FIG. 1) | Boiling point (° C.) |
|---|---|
| X = CF$_3$; Y = CF$_3$ | 70-71 |
| X = CH$_3$; Y = CF$_3$ | 105-107 |
| X = CH$_3$; Y = CH$_3$ | 140.4 |
| X = tBu; Y = CF$_3$ | 138-141 |
| X = tBu; Y = CF$_2$CF$_2$CF$_3$ | 178-479. |

The β-diketone compounds are commercially available from numerous sources. In some embodiments, the β-diketone compound is AcAc. In other embodiments, the β-diketone compound is TFA. In other embodiments, the β-diketone compound is HFA. In yet other embodiments, the β-diketone compound is AcAc and TFA.

Figure 1:
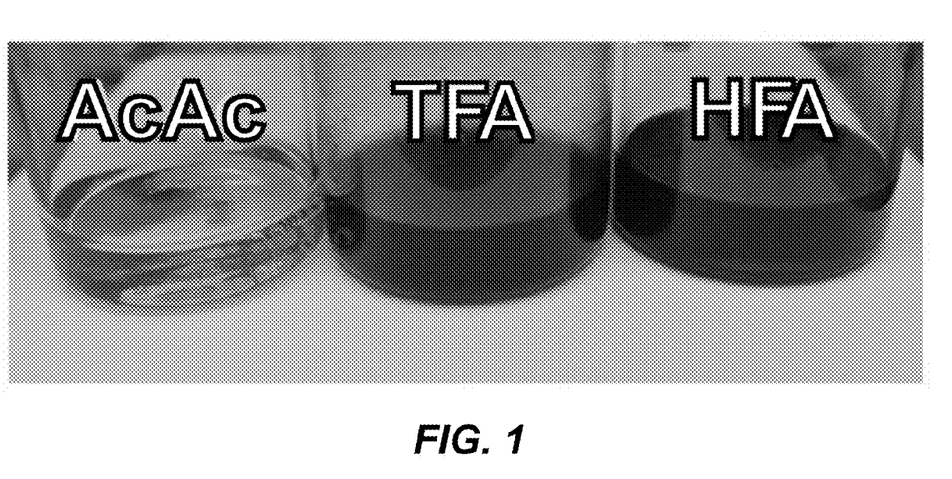
FIG. 1 is a photograph showing a Nd—Fe—B magnetic material dissolved in 2,4-pentadione or acetylacetone (AcAc), 1,1,1-trifluoro-2,4-pentadione (TFA), and 1,1,1,5,5,5-hexafluoro-2,4-pentadione (HFA), respectively, according to embodiments of the disclosure.

The REE magnetic material may be dissolved in the dissolution organic solvent and the β-diketone compound to form the dissolved REE mixture that initially includes the REE magnetic material, β-diketone compound, and dissolution organic solvent. As described in more detail below, the dissolved REE mixture includes reaction products as the reaction proceeds. The dissolved REE mixture may, initially, include about 1 part of the REE magnetic material to at least about 3 parts of the β-diketone compound, along with a minimal amount of the dissolution organic solvent to assist in dissolving the REE magnetic material. A ratio of the β-diketone compound:REE in the dissolved REE mixture may be greater than about 3:1. To ensure complete dissolution of the REE magnetic material, up to an excess of the dissolution organic solvent may be used relative to the REE magnetic material, with a majority of the dissolution organic solvent subsequently removed before adding the separation organic solvent. The dissolved REE mixture may also be heated to ensure complete dissolution of the REE magnetic material. The dissolution organic solvent may be heated to its boiling point before adding the REE magnetic material. Dissolution of the REE magnetic material may take from about 6 hours to about 96 hours depending on the particle size of the REE magnetic material. In some embodiments, the β-diketone compound is a fluorinated β-diketone compound because the REE magnetic material exhibits increased solubility or is quicker to dissolve in the fluorinated β-diketone compound compared to the β-diketone compound lacking fluorine atoms. As shown in FIG. 1, the Nd—Fe—B magnetic material dissolves in each of AcAc, TFA, and HFA. If the REE magnetic material includes binders or coatings, such as polymeric binders or coatings, these components are removed from the dissolved REE mixture by filtration following the dissolution of the REE magnetic material. The dissolution organic solvent may be toluene, acetonitrile, a similar organic solvent, or combinations thereof. Since the REE magnetic material is soluble in the β-diketone compound and dissolution organic solvent, no aqueous phase is utilized to dissolve the REE magnetic material. Additionally, no aqueous mineral acid is utilized to dissolve the REE magnetic material. The REE magnetic material may be sufficiently soluble in the dissolution organic solvent and β-diketone compound that no basic medium, such as a hydroxide or a hydride, is utilized. The dissolution organic solvent may be substantially removed from the dissolved REE mixture, such as by evaporation (e.g., using a rotary evaporator), before adding the separation organic solvent. The dissolved REE mixture, after removing the dissolution organic solvent, may include solids at room temperature (from about 20° C. to about 25° C.) or lower.

During the dissolution of the REE magnetic material, deprotonation of the acidic proton of the β-diketone compound occurs, as shown in the reaction below where M is the REE and X and Y of the β-diketone compound are as previously described:

When the β-diketone compound is AcAc, the deprotonation proceeds as shown in the reaction below, where M is the REE:

The deprotonated β-diketone compound chelates with the REE, forming the β-diketonate chelate complex as shown below, where M is the REE:

By way of example only, if the β-diketone compound is AcAc, the reaction proceeds according to the equations below, where Ln is a lanthanide element, scandium, or yttrium:

$$2Ln+6AcAcH \rightarrow 2Ln(AcAc)_3+3H_2$$

$$Ln_2O_3+6AcAcH \rightarrow 2Ln(AcAc)_3+3H_2O.$$

The hydrogen evolved as the deprotonated β-diketone compound and REE react may be removed by flowing an inert gas, such as nitrogen, over the dissolved REE mixture during the reaction.

If the REE magnetic material includes the REE and another metal, such as a transition metal, the deprotonated β-diketone compound may chelate with the REE and with the transition metal, forming β-diketonate chelate complexes of the REE and of the transition metal. By way of example only, if the REE magnetic material is Nd—Fe—B, β-diketonate chelate complexes of neodymium and of iron may be formed. Once iron is oxidized, the iron may alternate between two oxidation states in these solutions, where exemplary β-diketonate chelate complexes of iron include complexes with iron in its 2+ or 3+ oxidation states as shown below:

The desired β-diketone chelate complex may be separated from other reaction products or the different β-diketone chelate complexes may be separated from another based on their respective solubilities in the separation organic solvent. For example, the iron β-diketonate chelate complex may be more soluble in the separation organic solvent than the neodymium β-diketonate chelate complex. The neodymium β-diketonate chelate complex may be separated from the iron β-diketonate chelate complex in the dissolved REE mixture, enriching the neodymium β-diketonate chelate complex relative to its initial amount in the REE magnetic material.

If the β-diketone compound is a fluorinated β-diketone compound, the deprotonated β-diketone compound and REE may react faster at room temperature due to the increased reactivity of the β-diketone compound.

The β-diketonate chelate complex is separated and recovered from the dissolved REE mixture by distillation or extraction using the separation organic solvent. Before separation occurs, the dissolved REE mixture may be filtered to remove solids and dried. The β-diketonate chelate complex may be separated and recovered by distilling the other reaction products, or extracting the other reaction products using the separation organic solvent depending on the boiling points of the other reaction products relative to the boiling points and the decomposition temperatures of the β-diketonate chelate complex. The other reaction products may include, but are not limited to, unreacted β-diketone compound, undesired β-diketonate chelate complex, unreacted β-diketonate chelate complex, or combinations thereof. Alternatively, the β-diketonate chelate complex may be distilled, or extracted from the dissolved REE mixture depending on the boiling points of the other reaction products relative to the boiling points and the decomposition temperatures of the β-diketonate chelate complex.

Figure 2:
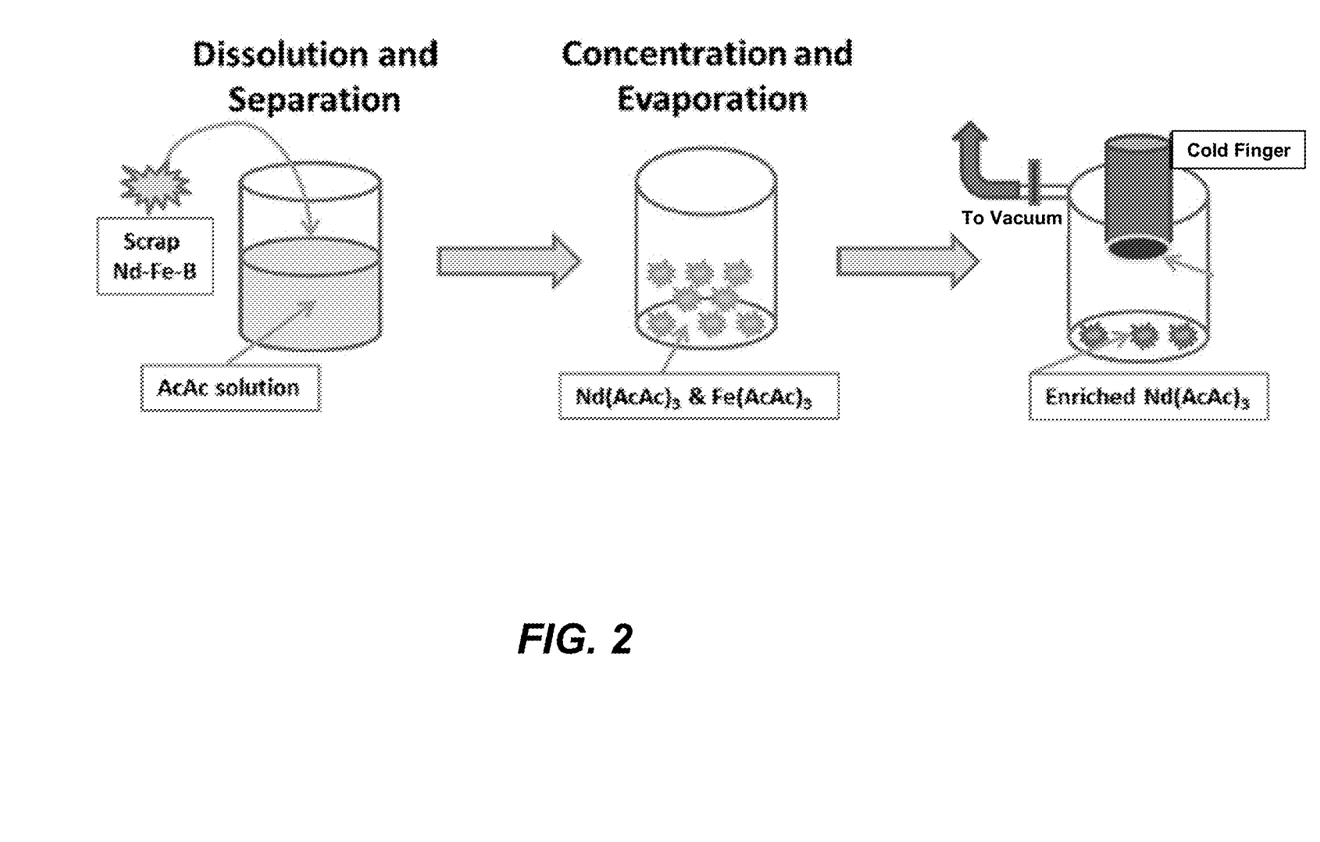
FIG. 2 is a schematic illustration of the dissolution of a Nd—Fe—B magnetic material and subsequent separation of a neodymium β-diketonate chelate complex according to embodiments of the disclosure.

As also shown in FIG. 2, the β-diketonate chelate complex, such as a neodymium β-diketonate chelate complex or an iron β-diketonate chelate complex, may be separated from the dissolved REE mixture by distilling the other reaction products from the dissolved REE mixture. The β-diketonate chelate complex may be distilled if the boiling point of the β-diketonate chelate complex is sufficiently different from, e.g., sufficiently greater than, the boiling point of the other reaction products. If the REE magnetic material includes the REE and another metal, such as a transition metal, the REE β-diketonate chelate complex in the dissolved REE mixture may be separated from the transition metal β-diketonate chelate complex by distilling the transition metal β-diketonate chelate complex.

The β-diketonate chelate complex, such as the neodymium β-diketonate chelate complex, may be separated from the dissolved REE mixture by extracting the other reaction products, such as by using a Soxhlet extraction apparatus or a separatory funnel. If the REE magnetic material includes the REE and another metal, such as a transition metal, the REE β-diketonate chelate complex in the dissolved REE mixture may be separated from the transition metal β-diketonate chelate complex, such as the iron β-diketonate chelate complex, by extracting the dissolved REE mixture with the separation organic solvent. The transition metal β-diketonate chelate complex may be more soluble in the separation organic solvent than the REE β-diketonate chelate complex. To enrich the REE β-diketonate chelate complex, the dissolved REE mixture may be continuously extracted with the separation organic solvent, such as in a continuous flow extraction using the Soxhlet extraction apparatus. The separation organic solvent may be an aromatic solvent, such as a xylene (e.g., o-xylene, m-xylene), or combinations thereof. By using the continuous flow extraction, the REE β-diketonate chelate complex may become enriched while other reaction products, including the transition metal β-diketonate chelate complex, are substantially removed. The continuous flow extraction also enables a minimal amount of the separation organic solvent to be used. By way of example only, the REE β-diketonate chelate complex may be the neodymium β-diketonate chelate complex (e.g., Nd(AcAc)$_3$) and the transition metal β-diketonate chelate complex may be the iron β-diketonate chelate complex (e.g., Fe(AcAc)$_3$).

Figure 3:
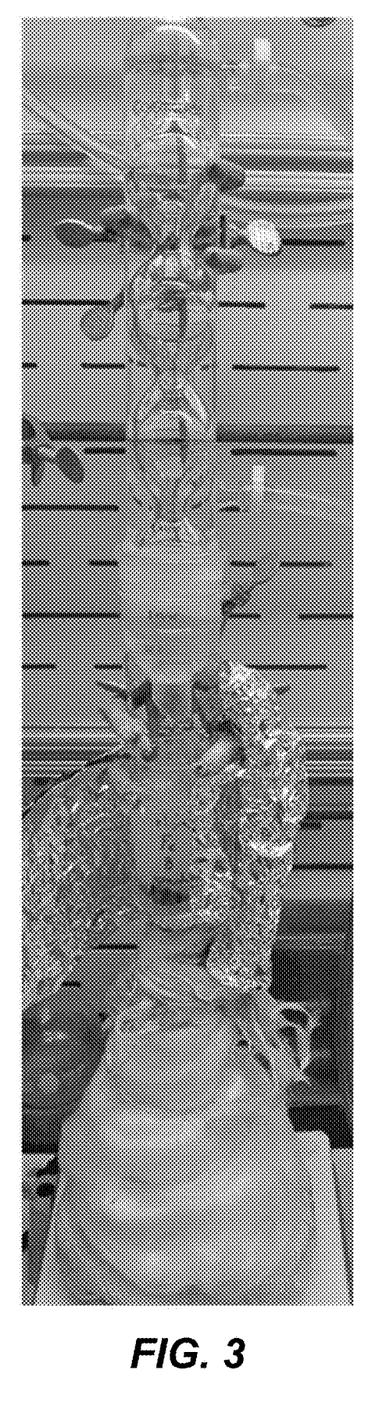
FIG. 3 is a photograph of a Soxhlet extraction apparatus for separating a neodymium β-diketonate chelate complex according to embodiments of the disclosure.

As shown in FIG. 3, in the Soxhlet extraction, solids from the dissolved REE mixture (after removal of the dissolution organic solvent) may be placed in a thimble of the Soxhlet extraction apparatus and a vessel containing the separation organic solvent attached to the Soxhlet extraction apparatus. The separation organic solvent is heated to its boiling point in the vessel and passed through a distillation path, where the separation organic solvent cools. As the separation organic solvent condenses, the separation organic solvent is passed over the solids of the dissolved REE mixture, extracting the other reaction products from the REE β-diketonate chelate complex. Since the separation organic solvent is continuously flowed over the solids of the dissolved REE mixture and since the REE β-diketonate chelate complex and other reaction products exhibit different solubilities in the separation organic solvent, the other reaction products are substantially removed from the solids of the dissolved REE mixture, enriching the REE β-diketonate chelate complex in the thimble while the other reaction products and the separation organic solvent are collected in the vessel. The REE β-diketonate chelate complex may be dried, producing the REE β-diketonate chelate complex as a powder or other solid. The REE β-diketonate chelate complex may be enriched to between about 70 wt % and about 85 wt %, from about 20 wt % of the REE initially present in the REE magnetic material using Soxhlet extraction with xylene as the separation organic solvent. The REE β-diketonate chelate complex may be further enriched to greater than about 90 wt % by purifying, e.g., sublimating, any remaining reaction products.

The β-diketonate chelate complex may be subjected to additional processing to recover the REE ions, oxides of the REE, or salts of the REE. The β-diketonate chelate complex may be converted to the REE oxides or REE salts by heating or mineral acid processes.

While embodiments of the disclosure describe separating and recovering neodymium from an Nd—Fe—B magnetic material, methods of the disclosure may be used to separate and recover other REEs from other REE magnetic materials. In addition, similar methods of the disclosure may be used to separate and recover oxides or salts of the REE.

Example 1

Figure 4:
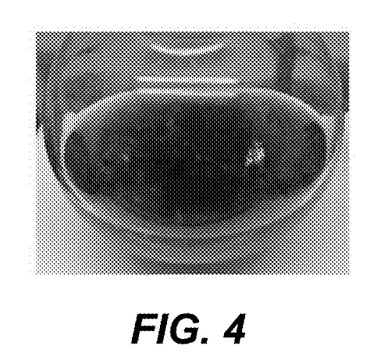
FIGS. 4-7 are photographs showing the dissolution of a Nd—Fe—B magnetic material and subsequent separation of a neodymium β-diketonate chelate complex according to embodiments of the disclosure.
Figure 5:
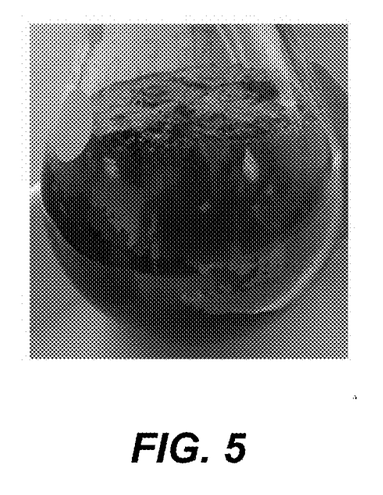

5.0 grams of Nd—Fe—B metal alloy (preferably demagnetized) was added to a 100 ml round bottom flask equipped with a magnetic stirrer, water condenser, and gas inlet adapter. 30 ml of 1,1,1-trifluoro-2,4-pentanedione, 20 ml of 2,4-pentanedione, and 25 ml of acetonitrile (A.C.S. grade) were added directly to the round bottom flask. The flask was purged with nitrogen and the adapter attached to a gas bubbling system to vent the hydrogen gas with nitrogen flow. The system was stirred and heated to a light reflux. Over time, the solution dissolved the metal into a dark red-orange solution as shown in FIG. 4, and the system was stopped after the solid metal powder did not aggregate together with a strong magnet. The dissolution time period took between about 24 and about 72 hours depending on the particle size of the Nd—Fe—B metal alloy. After dissolution, the solvent mixture was placed on a rotary evaporator to remove the volatile organic solvent (i.e., acetonitrile) and formed a condensed solution that solidified at room temperature or lower (refrigerator), as shown in FIG. 5. The condensed solution included solids from the dissolved REE mixture after removal of the acetonitrile. The dark red solid residue was washed with xylene (ortho and meta) and filtered (fluted paper filter) to remove some of the iron β-diketonate chelate complex, unbound diketonate, and unbound 2,4-pentanedione and 1,1,1-trifluoro-2,4-pentanedione. The remaining solids were left to air dry prior to using the Soxhlet extraction (continuous solvent wash).

Figure 6:
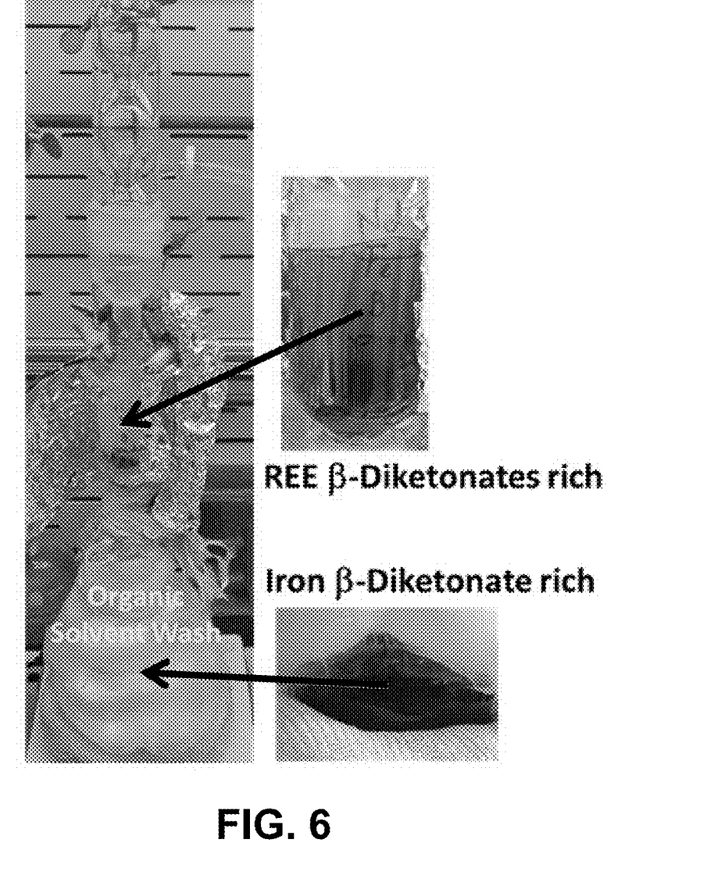
Figure 7:
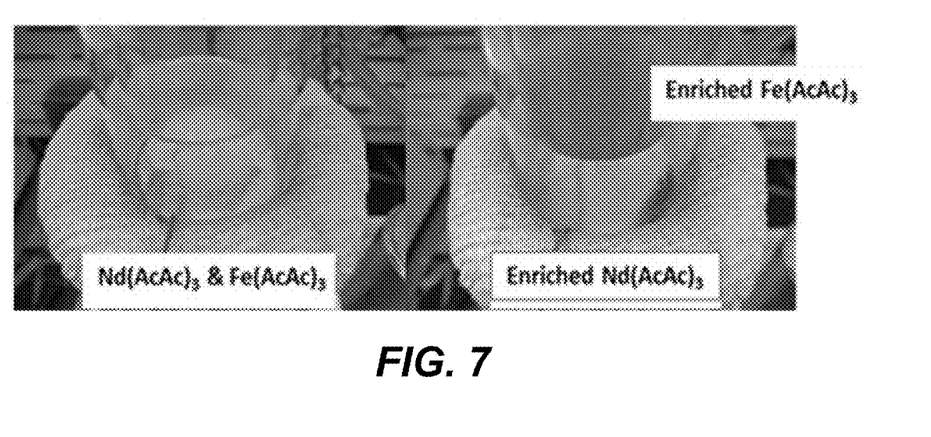

A 500 ml flask filled with about 300 ml of xylene (ortho and meta; ACS grade) was attached to a medium size Soxhlet extraction apparatus (85 ml to 100 ml extractor capacity). Approximately 6 grams to 10 grams of solid residue was placed in a 120 mm PTFE (0.45 um) filter and placed into the Soxhlet extraction apparatus. The xylene was heated to a rapid boil to circulate in the Soxhlet extraction apparatus. Once the xylene was circulating, the washing process was conducted for up to about 24 hours to complete washing the solids. The iron β-diketonate chelate complex was removed by the xylene, leave the neodymium β-diketonate chelate complex in the PTFE filter, as shown in FIG. 6. The remaining solids in the PTFE filter were allowed to air dry, giving a tan to brown powder. For comparison, a mixture of a neodymium β-diketonate chelate complex and an iron β-diketonate chelate complex (left side) and the neodymium β-diketonate chelate complex (right side) are shown in FIG. 7.

Elemental analysis of the isolated powder was conducted by Elemental Analysis/Ion Coupled Plasma Mass Spectroscopy (EA/ICP-MS). The EA/ICP-MS showed that the Soxhlet extraction enriched the neodymium from its starting amount of between about 20 wt % and about 30 wt % (common neodymium magnet alloy amounts) to between about 70 wt % and about 85 wt %, without additional purification. In the solvent washes, neodymium was observed to be near detection levels. The elemental analysis was conducted twice, with less than about 5% error observed between the two analyses.

TABLE 3

EA/ICP-MS of Sample.

| Sample | % Nd | % Fe | % B |
|---|---|---|---|
| Nd magnetic material - lump (1) | 36.2 | 62.6 | 1.3 |
| Nd magnetic material - flakes (2) | 18.1 | 80.3 | 1.6 |
| Soxhlet wash - (1) | 86.8 | 11.0 | 2.2 |
| Soxhlet wash - (2) | 74.1 | 24.1 | 1.9 |
| Solvent from Soxhlet wash - (1) | — | 98.8 | 1.9 |
| Nd magnetic material - lump (1) | 34.2 | 64.5 | 1.3 |
| Nd magnetic material - flakes (2) | 19.0 | 79.1 | 1.9 |
| Soxhlet wash - (1) | 80.6 | 14.6 | 4.8 |
| Soxhlet wash - (2) | 75.3 | 23.1 | 1.6 |
| Solvent from Soxhlet wash - (1) | 0.5* | 99.0 | 0.5 |
| Solvent from Soxhlet wash - (2) | 0.1* | 99.5 | 0.4 |

— Below detection levels
*At detection levels

What is claimed is:

1. A method of recovering a rare earth element, comprising:
    dissolving a rare earth element magnetic material in a dissolution organic solvent and a β-diketone compound to form a dissolved rare earth element mixture;
    reacting a rare earth element of the rare earth element magnetic material and the β-diketone compound to form a β-diketonate chelate complex;
    removing the dissolution organic solvent from the dissolved rare earth element mixture;
    removing the β-diketonate chelate complex from the dissolved rare earth element mixture using a separation organic solvent; and
    recovering the β-diketonate chelate complex.

2. The method of claim 1, wherein dissolving a rare earth element magnetic material in a dissolution organic solvent and a β-diketone compound comprises dissolving a rare earth element magnetic material comprising the rare earth element and a transition metal in the dissolution organic solvent and the β-diketone compound.

3. The method of claim 1 wherein dissolving a rare earth element magnetic material in a dissolution organic solvent and a β-diketone compound comprises dissolving the rare earth element magnetic material in a non-aqueous solution.

4. The method of claim 1, wherein dissolving a rare earth element magnetic material in a dissolution organic solvent and a β-diketone compound comprises dissolving the rare earth element magnetic material in the dissolution organic solvent and a β-diketone compound selected from the group consisting of 2,4-pentadione or acetylacetone (AcAc), 1,1,1-trifluoro-2,4-pentadione (TFA), 1,1,1,5,5,5-hexafluoro-2,4-pentadione (HFA), 1,1,1-trifluoro-5,5-dimethyl-2,4-hexanedione (TFBA), 1,1,1, 2,2,3,3-heptafluoro-7,7-dimethyl-4,6-octanedione (FOD), 3-methyl-2,4-pentadione, or combinations thereof.

5. The method of claim 1, wherein dissolving a rare earth element magnetic material in a dissolution organic solvent and a β-diketone compound comprises dissolving the rare earth element magnetic material in toluene, acetonitrile, or combinations thereof.

6. The method of claim 1, wherein dissolving a rare earth element magnetic material in a dissolution organic solvent and a β-diketone compound comprises dissolving a neodymium-iron-boride magnetic material in the dissolution organic solvent and β-diketone compound.

7. The method of claim 1, wherein removing the β-diketonate chelate complex from the dissolved rare earth element mixture using a separation organic solvent comprises continuously extracting the β-diketonate chelate complex with the separation organic solvent.

8. The method of claim 1, wherein removing the β-diketonate chelate complex from the dissolved rare earth element mixture using a separation organic solvent comprises removing the β-diketonate chelate complex using xylene.

9. The method of claim 1, wherein removing the β-diketonate chelate complex from the dissolved rare earth element mixture using a separation organic solvent comprises separating the β-diketonate chelate complex from reaction products not soluble in the separation organic solvent.

10. The method of claim 1, further comprising recovering the rare earth element from the β-diketonate chelate complex.

11. A method of recovering a rare earth element, comprising:
    combining a rare earth element material with a dissolution organic solvent and a β-diketone compound to form a rare earth element mixture;
    reacting a rare earth element of the rare earth element material with the β-diketone compound to form a rare earth element β-diketonate chelate complex;
    removing the dissolution organic solvent from the rare earth element mixture;
    separating the rare earth element β-diketonate chelate complex from the rare earth element mixture using a separation organic solvent; and
    recovering the rare earth element from the rare earth element β-diketonate chelate complex.

12. The method of claim 11, wherein combining a rare earth element material with a dissolution organic solvent and a β-diketone compound to form a rare earth element mixture comprises forming the rare earth element mixture comprising the rare earth element and a transition metal.

13. The method of claim 11, wherein reacting a rare earth element of the rare earth element material with the β-diketone compound to form a rare earth element β-diketonate chelate complex comprises forming the rare earth element β-diketonate chelate complex and a transition metal β-diketonate chelate complex.

14. The method of claim 13, wherein separating the rare earth element β-diketonate chelate complex from the rare earth element mixture comprises separating the rare earth element β-diketonate chelate complex and the transition metal β-diketonate chelate complex.

15. The method of claim 11, further comprising converting the rare earth element β-diketonate chelate complex to a rare earth element oxide or a rare earth element salt.

16. A method of recovering a rare earth element, comprising:
    dissolving a material comprising neodymium in a dissolution organic solvent and a β-diketone compound to form a rare earth element mixture;
    reacting the neodymium with the β-diketone compound to form a neodymium β-diketonate chelate complex;
    removing the dissolution organic solvent from the rare earth element mixture;
    separating the neodymium β-diketonate chelate complex from the rare earth element mixture using a separation organic solvent; and
    recovering the neodymium β-diketonate chelate complex.

17. The method of claim 16, wherein dissolving a material comprising neodymium comprises dissolving a neodymium-iron-boride material in the dissolution organic solvent and β-diketone compound.

18. The method of claim 16, wherein recovering the neodymium β-diketonate chelate complex comprises separating the neodymium β-diketonate chelate complex from a transition metal β-diketonate chelate complex.

19. The method of claim 16, wherein recovering the neodymium β-diketonate chelate complex comprises separating the neodymium β-diketonate chelate complex from an iron β-diketonate chelate complex.

20. The method of claim 16, further comprising recovering the neodymium.

21. The method of claim 1, wherein dissolving a rare earth element magnetic material in a dissolution organic solvent and a β-diketone compound comprises dissolving a magnetic material comprising cerium, dysprosium, erbium, europium, gadolinium, holmium, lanthanum, lutetium, neodymium, praseodymium, promethium, samarium, scandium, terbium, thulium, ytterbium, yttrium, or a combination thereof in the dissolution organic solvent and β-diketone compound.

* * * * *